United States Patent

[11] 3,629,689

| [72] | Inventor | James A. Riff |
| | | Chicago, Ill. |
| [21] | Appl. No. | 36,911 |
| [22] | Filed | May 13, 1970 |
| [45] | Patented | Dec. 21, 1971 |
| [73] | Assignee | Motorola, Inc. |
| | | Franklin Park, Ill. |

[54] VOLTAGE REGULATOR FOR BRUSHLESS ALTERNATORS INCLUDING A SQUARE WAVE MULTIVIBRATOR
5 Claims, 2 Drawing Figs.

[52] U.S. Cl. .................................................. 322/28, 322/73, 323/25, 331/113 R, 331/144
[51] Int. Cl. ........................................................ H02p 9/30
[50] Field of Search.......................................... 322/28, 59, 73, 75; 323/22 T, 23, 25; 331/113 R, 144

[56] References Cited
UNITED STATES PATENTS

| 3,039,066 | 6/1962 | Kenny | 331/113 |
| 3,231,757 | 1/1966 | Rainer et al. | 322/28 X |
| 3,401,328 | 9/1968 | Hartung | 322/28 |
| 3,522,520 | 8/1970 | Goldman | 322/28 |
| 3,530,368 | 9/1970 | Gerard | 323/22 T |

*Primary Examiner*—Benjamin Dobeck
*Assistant Examiner*—H. Huberfeld
*Attorney*—Mueller & Aichele

ABSTRACT: A voltage regulator for brushless alternators including an oscillator circuit which has the output thereof fed into stationary, primary winding of a rotary transformer device which has a rotatable secondary winding secured to the rotor shaft of the alternator. The oscillator is a free running, square wave multivibrator with cross coupling means between the output of one transistor stage thereof to the input of the other transistor stage. The oscillator operates at a frequency within a given range of frequencies dependent on load conditions, and the output of the oscillator is controlled by a voltage sensor between fully on and fully off conditions to regulate the power output of the alternator.

INVENTOR.
JAMES A. RIFF
BY Mueller & Aichele
ATTORNEYS.

VOLTAGE REGULATOR FOR BRUSHLESS ALTERNATORS INCLUDING A SQUARE MULTIVIBRATOR WAVE

BACKGROUND OF THE INVENTION

This invention relates generally to a voltage regulator circuit and more particularly to a voltage regulator circuit for use in controlling the output of a brushless alternator.

Heretofore, dynamoelectric machines, such as alternators for motor vehicles or the like, require the use of slip rings and brushes to apply the necessary DC voltage to the rotor winding thereof to establish the magnetic field necessary to induce a voltage output in the stator of the alternator. This arrangement is generally adequate for situations where the motor vehicle using such alternators is operated over moderate distances, as for example, 75,000 miles or so. However, when considering this mileage in comparison with the mileage travelled by trucks or buses, or other long mileage vehicles, this is of minor consequence. For example, a truck or bus generally operates for a range of 200,000 to 300,000 miles or more, in which case it may be necessary to replace the alternator two or three times during this period. To overcome this problem, brushless alternators are used. However, when using such brushless alternators which can operate for long periods of time, it is also desirable to provide improved voltage regulator means which can operate efficiently and reliably over the same long period of time.

SUMMARY OF THE INVENTION

Therefore, it is an object of this invention to provide an improved voltage regulator for use with brushless alternators.

A feature of this invention is the use of an oscillator circuit which oscillates continuously within a limited range of frequencies and which is rendered fully operative and fully inoperative in response to the output voltage of the alternator being controlled thereby. Also, increasing load at the output of the alternator will cause the frequency of the oscillator to vary within limits.

Briefly, the voltage regulator circuit of the illustrated embodiment of this invention includes a stationary, primary winding of a transformer which has the secondary winding thereof fastened to and rotatable with the rotor shaft of the alternator. An oscillator is provided and has a frequency in the order of 20 kHz. or so, and may be a square wave oscillator, or the like. Preferably, the oscillator frequency is somewhat dependent on the load of the alternator being controlled, with an increasing load causing an increase in oscillator frequency. Hence the oscillator may vary between 18 kHz. and 22 kHz. or so. The output of the oscillator is arranged to be transformer coupled into the rotary secondary winding and then rectified through a bridge rectifier circuit mounted directly on the rotor of the alternator. The rectified signal is then applied to the alternator rotor as an average DC voltage current which induces the necessary magnetic field therein to provide an output at the stator winding adjacent the rotor.

Most advantageously, the oscillator circuit of the illustrated embodiment of this invention incorporates a square wave oscillator having cross coupling feedback at the output of each stage back to the input of a corresponding stage. The square wave oscillator operates substantially as a free running multivibrator continuously applying output signals to be transformer coupled into the rotary secondary winding of the rotary transformer on the alternator. A pair of high-gain switching transistors are controlled in response to a sensing circuit which, in turn, is coupled to the output of the alternator to sense the output condition thereof. The oscillator circuit is switched between fully on and fully off conditions, and during each on condition will operate at a then fixed frequency condition as determined by the component value and the reflected impedance of the primary winding of the rotary transformer. Also, the inductance-resistance time constant of the rotor of the alternator determines the regulator switching time which, in the embodiment disclosed herein, may be in the order of 100 milliseconds at no load or low load conditions. The load at the output of the alternator determines the duty cycle of the oscillator such that a decreased load causes the oscillator to be switched off for a substantial portion of the time while an increased load will cause the oscillator to be switched on for a substantial portion of the time or continuously. This type of switching arrangement offers a relatively high efficiency in that the input power to the primary of the rotary transformer, with respect to the power applied to the field winding of the rotor, is about 63 percent, more or less.

DESCRIPTION OF THE PREFERRED EMBODIMENT

Figures 1, 2:
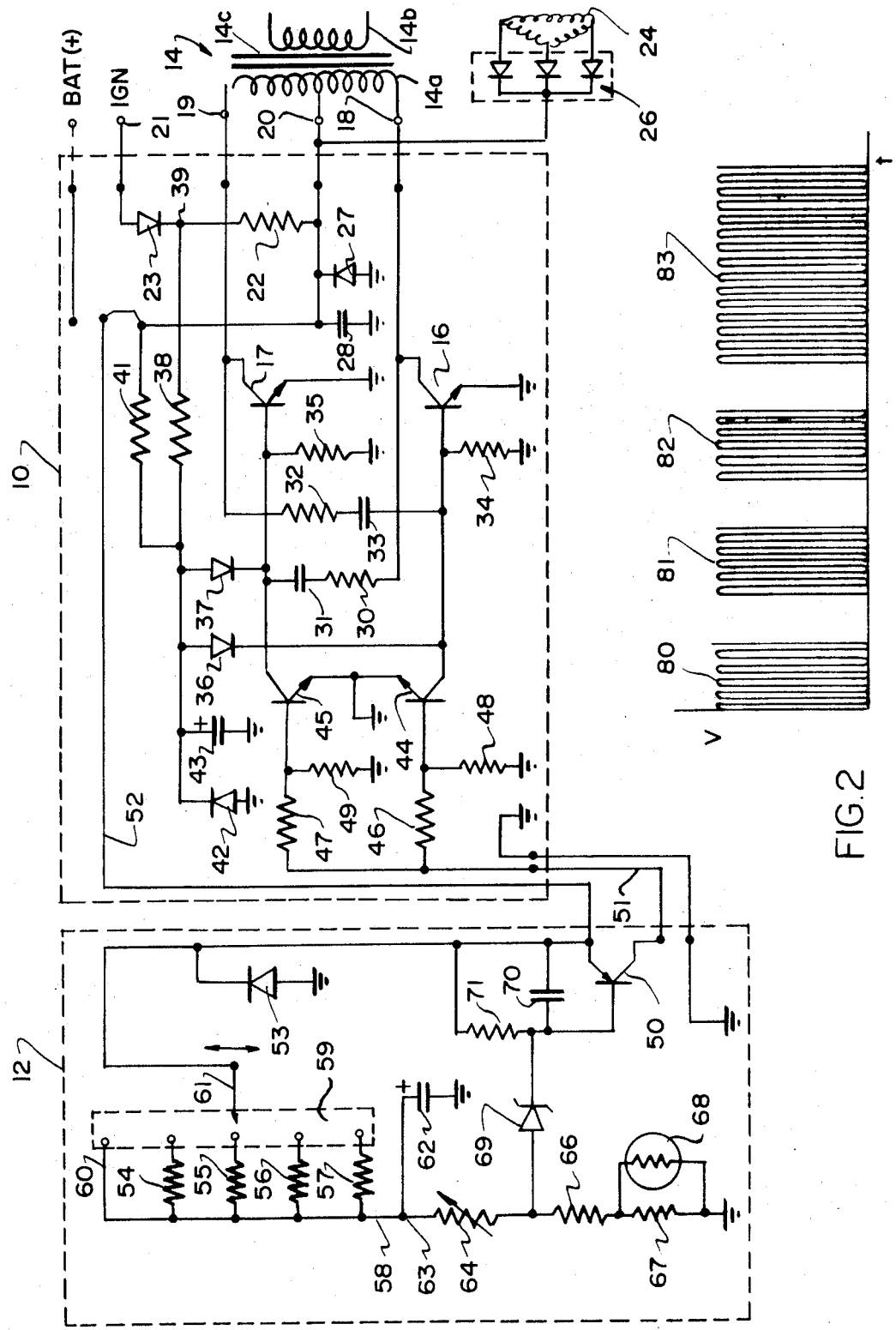
FIG. 1 is a schematic diagram showing the voltage regulator circuit of the illustrated embodiment disclosed herein.
FIG. 2 is a graphical representation of the oscillator output signal shown as being alternately interrupted between fully on and fully off states under low conditions and a fully on state under a full load condition.

Referring now to FIG. 1, an oscillator circuit is designated generally by reference numeral 10 and controlled in response to a sensing circuit 12 connected thereto and responsive to the output of an alternator. Here the rotary transformer is designated by reference numeral 14 and includes a stationary, primary winding 14a connected to the oscillator circuit 10, and a rotary secondary winding 14b mounted on the rotor shaft (not shown) of the alternator for rotation therewith. A bridge rectifier circuit (not shown) may be connected to the rotary secondary 14b to apply an average DC potential to the rotor winding of the alternator. A transformer core 14c is formed of powdered hydrogen annealed iron members spaced apart by a relatively small air gap to insure maximum magnetic field coupling. A rotary transformer suitable for this purpose is the subject matter of another application filed on May 6, 1970, Ser. No. 34,987 and assigned to the same assignee.

Most advantageously, the oscillator circuit of the illustrated embodiment of this invention includes a pair of transistors 16 and 17 connected to the end terminals 18 and 19, respectively of the stationary primary winding 14a. A center tap 20 of the primary winding 14a is connected to a terminal 21 for receiving power from the ignition switch of an automobile, for example, and this connection is obtained through a resistor 22 and a diode 23 connected in series therewith. The resistor 22 is of relatively low resistance value, but sufficient to restrict the current to the oscillator circuit during initial startup thereof so that the oscillator operates at a reduced voltage thus providing a reduced amplitude output. This reduced voltage insures that a sufficient magnetic field will be developed within the alternator at the beginning of operation, that is, during startup of the engine, without consuming excess power during the cranking sequence of the engine. Once the engine is started, an output signal will be developed at the stator winding 24 of the alternator which, in turn, is rectified through a diode trio 26 and applied to the center tap 20 of the stationary, primary winding 14a. This will provide full power input to the oscillator circuit during running of the motor vehicle engine to develop full power output. The center tap 20 is also connected to a diode 27 which is in parallel with a capacitor 28 to clip negative spikes of alternating-current voltage and to filter the input voltage from the diode trio 26 during operation of the alternator.

Most advantageously, transistors 16 and 17 operate substantially in a free running multivibrator mode with the collector electrode of transistor 16 being connected back to the base electrode of transistor 17 through a resistor 30 and a capacitor 31. Similarly, the collector electrode of transistor 17 is coupled back to the base electrode of transistor 16 through a resistor 32 and a capacitor 33 thus providing cross coupling feedback between these transistors. Biasing resistors 34 and 35 are connected to the base electrodes of transistors 16 and 17, respectively, to set the operating potential on the base of these transistors.

Bias potential is applied to the base electrodes of transistors 16 and 17 through diodes 36 and 37, respectively, which are tied back either to the ignition switch terminal 21 through the diode 23 or through the center tap terminal 20 through the resistor 22 via a resistor 38 to apply bias potential during startup of the engine. A second resistor 41 is also connected to the anodes of diodes 36 and 37, but this resistor is tied back directly to the center tap 20 of the primary winding 14a to receive the maximum current and voltage value as provided at the output of the diode trio 26. Resistors 38 and 41 serve to provide rapid startup of oscillations of the transistors 16 and 17 after a brief turnoff of these transistors. Additional negative clipping and filtering is provided by a diode 42 and a capacitor 43, respectively.

Preferably, the base electrodes of transistors 16 and 17 are shunted to ground potential in response to the high conduction state of either one of a pair of transistors 44 or 45. Conduction of transistors 44 and 45 completely terminates the operation of the oscillator circuit consisting of transistors 16 and 17. The base electrodes of transistors 44 and 45 are tied together through resistors 46 and 47, respectively, with resistors 48 and 49 being connected to ground potential to develop the necessary switching potential for these transistors. Resistors 46 and 47 are connected to the collector electrode of a control transistor 50 through a line 51. Control transistor 50 forms the output of the sensing circuit 12 and produces a sufficient control signal to switchably activate transistors 44 and 45 in response to the output of the alternator which is the voltage applied thereto via a line 52 coupled to the center tap terminal 20 and to the diode trio 26.

The sensing circuit 12 includes a diode 53 which clips negative spikes to ground potential. Also, a plurality of resistors 54, 55, 56 and 57 are connected to a common line 58 and to a switchable terminal board 59 whereat one of these transistors is selected to set the desired output voltage of the regulator. Also, a short circuit connection 60 is provided so that maximum obtainable output voltage can be selected if desired. That is, moving the connector 61 upwardly, as seen on the drawing, will cause an increase in the output voltage of the alternator while moving the connector 61 downwardly, as seen on the drawing, will cause a decrease in the output voltage of the alternator. A filter capacitor 62 is connected to a circuit point 63 located between the fixed resistors 54–57 and a variable resistor 64, and variable resistor 64 is provided for fine adjustment between the respective coarse adjustments afforded by selection of one of the resistors 54–57. Variable resistor 64 is connected through a resistor 66 which, in turn, is connected to a resistor 67 having a thermistor 68 connected in parallel therewith. Thermistor 68 provides for suitable temperature compensation during the various seasons, i.e. between summer and winter temperature operating conditions. A zener diode 69 has the cathode thereof connected to the base electrode of the control transistor 50 and to a capacitor 70 which serves somewhat as a filter capacitor to slow down the action of the transistor 50 and prevent extraneous triggering thereof as a result of undersired or unfiltered AC signals getting through the line 52. A biasing resistor 71 is provided to set the operating condition of transistor 50 as desired.

FIG. 2 illustrates the output signals obtained within the stationary, primary winding 14a during operation of the circuit of FIG. 1. Transistors 16 and 17 alternately conduct at a frequency in a range of 18 kHz. to 22 kHz. more or less, to produce an output signal as illustrated by reference numeral 80 and at low load condition is at the lower frequency and is interrupted upon conduction of transistors 44 or 45. This is followed by an output portion 81 again being interrupted and so on at 82. The interval between output portions 80, 81 and 82 decreases as the load requirements of the alternator increase until maximum load conditions exist as indicated by reference numeral 83, thus producing a continuous output of the oscillator circuit. Also, at this increased load condition, the frequency of the oscillator will decrease to about 18 kHz., for example. The circuit arrangement provides increased stability of the output voltage of the regulator circuit. Under these conditions, maximum power consumption of the alternator is occurring which may be, for example, in the order of 80 to 90+amperes. When the load condition subsides to a normal load or low load condition, the output signals at the stationary, primary winding 14a will again revert back to the series of periodic conditions of fully on and fully off operation of the oscillator circuit.

What has been described is a simple and efficient voltage regulator circuit which utilizes an oscillator formed substantially of a free running multivibrator circuit which is controlled between fully on and fully off states in response to the output of the alternator. Accordingly, variations and modifications of this invention may be effected without departing from the spirit and scope of the novel concepts disclosed and claimed herein.

I claim:

1. A voltage regulator circuit for a brushless alternator, comprising, in combination:
   a first fixed winding of a rotary transformer, the second winding of which is rotatable by the rotor shaft of the alternator of which a voltage output is to be regulated;
   a current supply source connected to said first fixed winding;
   a first transistor having an output connected to one end of said first fixed winding to provide alternate conductive and nonconductive conditions to cause unidirectional current pulses to flow in one-half of said winding, said first transistor having an input;
   a second transistor having an output connected to the other end of said first fixed winding to be conductive during intervals when said first transistor is nonconductive and to be nonconductive during intervals when said first transistor is conductive, to cause direct current pulses to flow through the other half of said winding at time intervals between current pulses through the first half thereof, said second transistor having an input;
   a first signal coupling circuit means connected between the output of said first transistor and the input of said second transistor, and a second signal coupling circuit means connected between the output of said second transistor and the input of said first transistor, each of said first and second signal coupling circuit means having a resistor connected in circuit with a capacitor, thus causing said first and second transistors to act as a multivibrator;
   a third transistor having a main current path therethrough shunting the input of said first transistor, and a fourth transistor having a main current path therethrough shunting the input of said second transistor; and
   voltage-responsive means connected to the output of the alternator to sense the voltage value thereof, said voltage response means including means coupled to the input electrodes of said third and fourth transistors to simultaneously disable both first and second transistors upon conduction of said third and fourth transistors to control the multivibrator formed thereby between fully on and fully off conditions.

2. The voltage regulator circuit of claim 1 wherein said first and second transistors and said first and second signal coupling circuit means form a free running multivibrator, and said voltage-responsive means interrupts the operation of said free running multivibrator.

3. The voltage regulator circuit of claim 1 wherein the frequency of operation of said multivibrator will change as a result of changes in reflected impedance of said first fixed winding corresponding to changes in load conditions of the alternator being controlled.

4. The voltage regulator circuit of claim 3 wherein said multivibrator decreases in frequency with increasing load and increases in frequency with decreasing load.

5. A voltage regulator circuit for a brushless alternator comprising in combination, a first fixed winding of a rotary transformer forming the main current receiver element of a multivibrator circuit, a second rotatable winding transformer coupled to said first fixed winding to operatively energize the alternator field in response to multivibrator action in said first fixed winding, an energizing source connected to said first fixed winding, first current control means having an output portion connected to one end of said first fixed winding to provide alternate conductive and nonconductive conditions and cause unidirectional current pulses to flow in one direction through said first fixed winding from said energizing source, said first current control means having an input portion, second current control means having an output portion connected to the other end of said first fixed winding to provide alternate conductive and nonconductive conditions and cause unidirectional current pulses to flow in the other direction through said first fixed winding from said energizing source, said second current control means having an input portion, and voltage-responsive circuit means connected to the input portions of said first and second current control means to control the multivibrator action produced thereby between fully on and fully off conditions.

* * * * *